Figure 1:
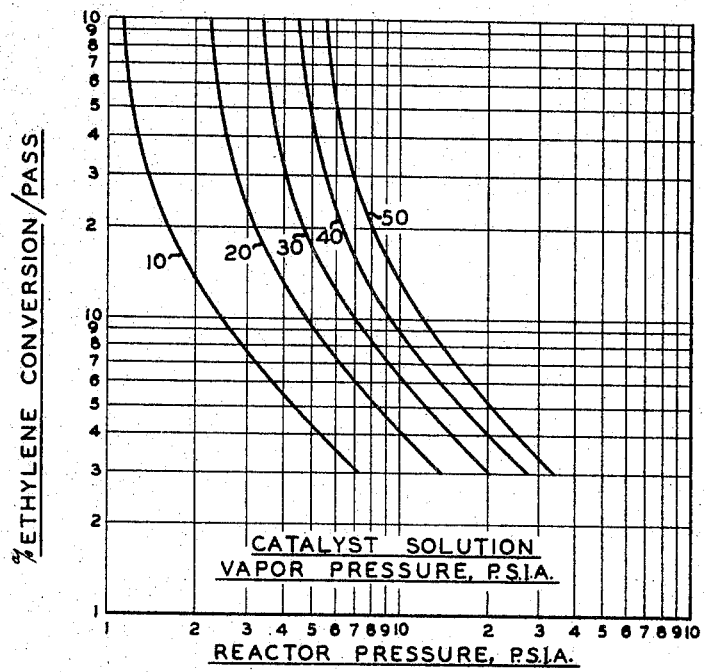

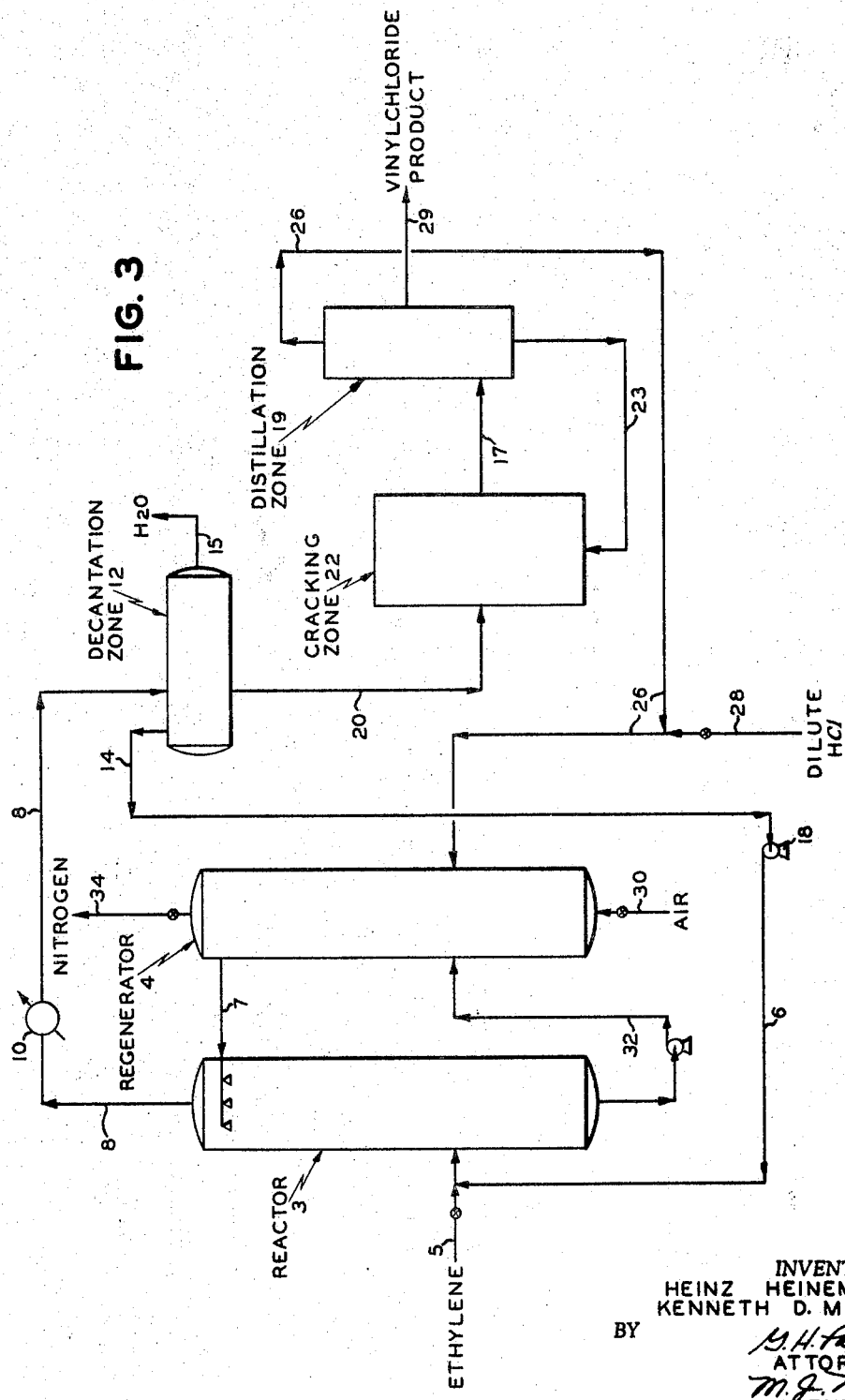

INVENTORS
HEINZ HEINEMANN
KENNETH D. MILLER, Jr.

Oct. 26, 1965  H. HEINEMANN ETAL  3,214,481
PROCESS FOR THE HALOGENATION OF HYDROCARBONS
Filed June 1, 1962  3 Sheets-Sheet 2
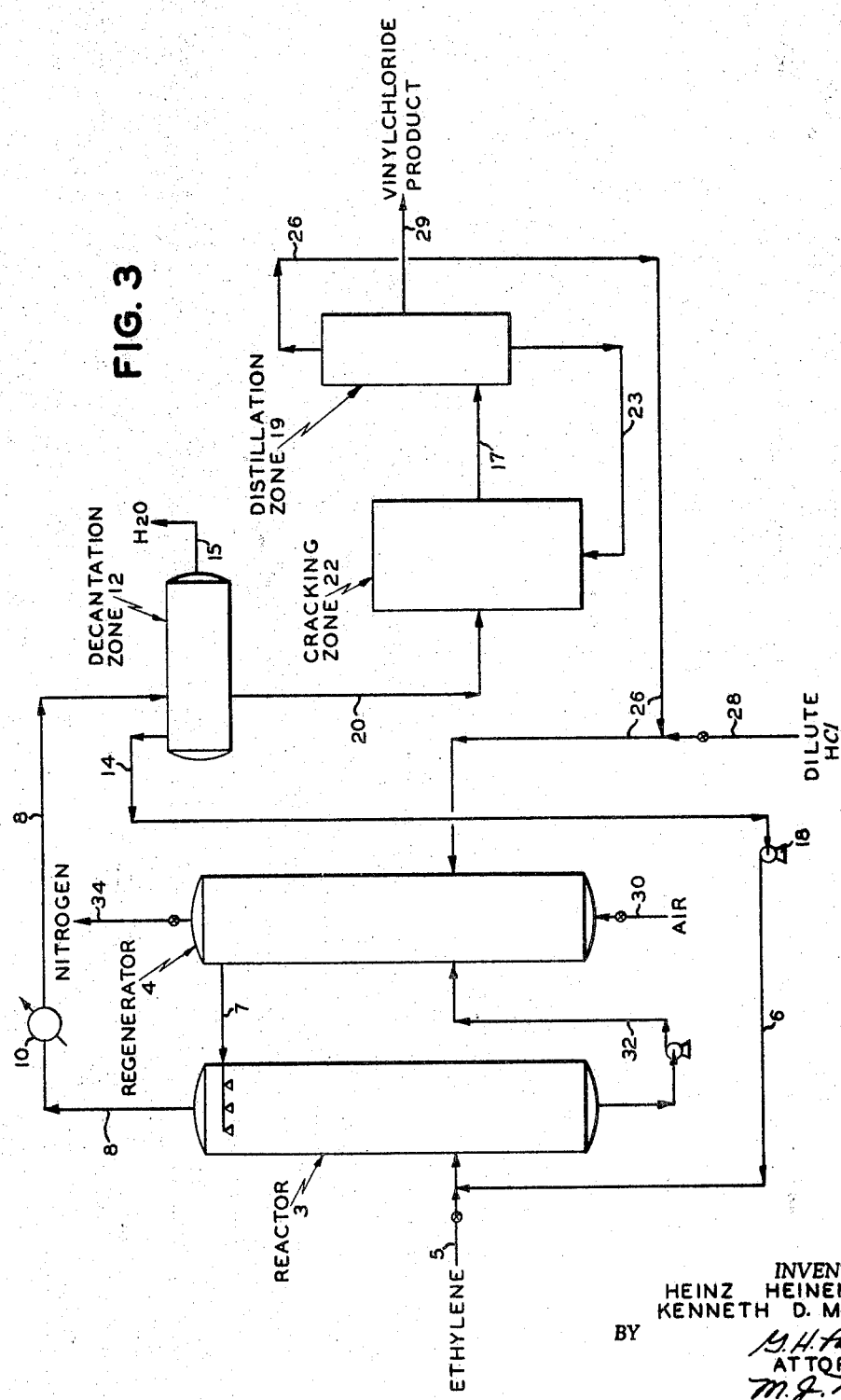
INVENTORS
HEINZ HEINEMANN
KENNETH D. MILLER, Jr.
BY
ATTORNEY
AGENT

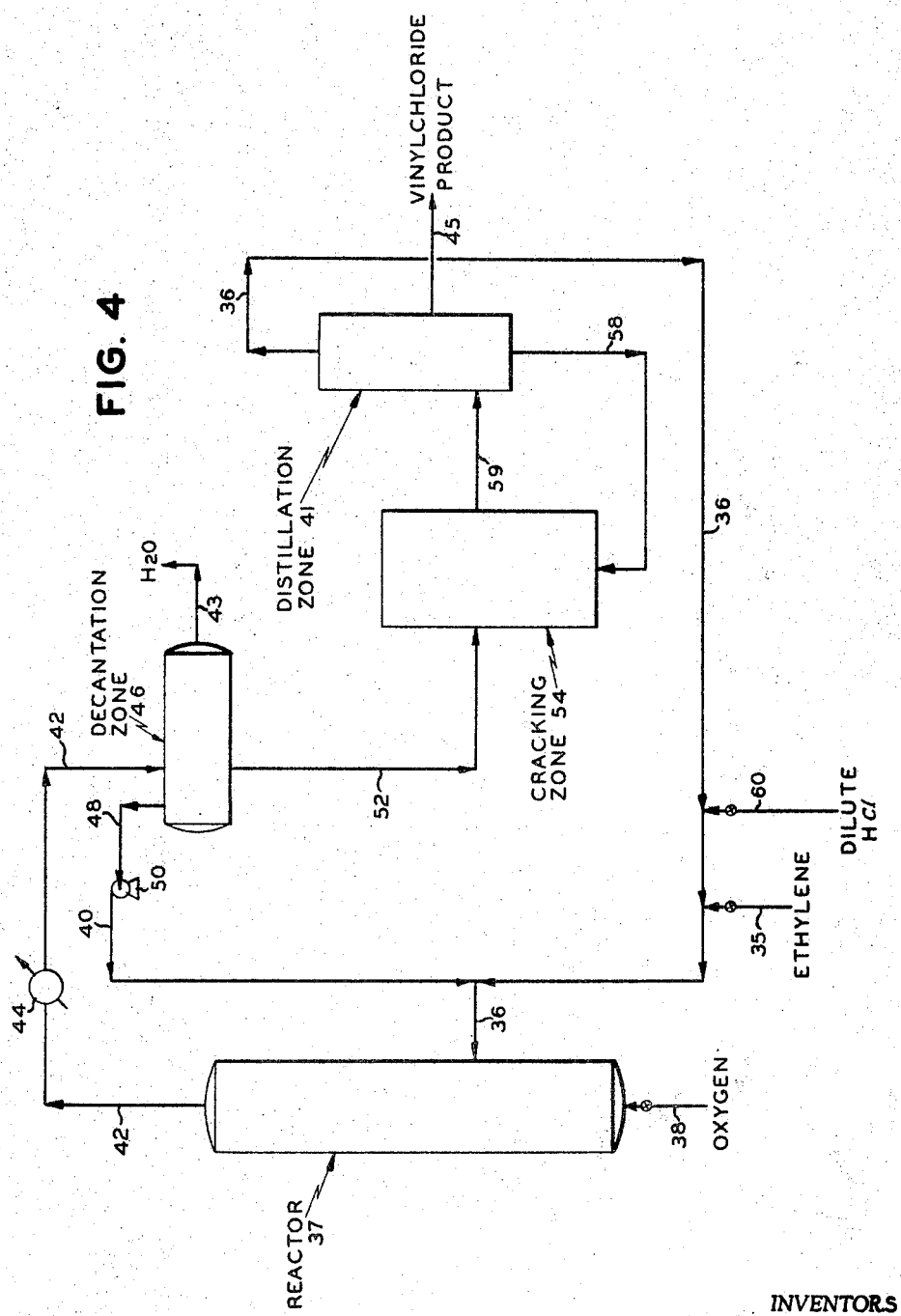

United States Patent Office 3,214,481
Patented Oct. 26, 1965

3,214,481
PROCESS FOR THE HALOGENATION OF
HYDROCARBONS
Heinz Heinemann and Kenneth D. Miller, Jr., Princeton,
N.J., assignors to Pullman Incorporated, a corporation
of Delaware
Filed June 1, 1962, Ser. No. 199,329
16 Claims. (Cl. 260—659)

This invention relates to the preparation of a metal halide catalyst for the halogenation of a hydrocarbon. In one aspect, this invention relates to the preparation of metal halide catalysts for the oxidation of hydrogen halide in the oxidative halogenation of a hydrocarbon. Still another aspect of this invention relates to an improved process for the halogenation of a hydrocarbon.

The halogenation of hydrocarbons with oxygen or air and a hydrogen halide in the presence of a metal halide catalyst is a process of primary importance in the commercial production of halogenated hydrocarbons of both saturated and unsaturated types. The catalyst heretofore employed in these halogenation processes are most usually halides of metals having variable valences or oxy halides of these metals. As employed in these reactions, the catalysts are usually deposited on solid carriers such as pumice, various natural clays, kieselguhr, alumina or silica or any other attrition-resistant carrier material and the solid mass is employed in the chlorination of hydrocarbons, either in a fixed or moving bed or in a fluidized state in a reaction zone.

The commercial success of these processes is due largely to the demand for halogenated compounds containing from 1 to 6 carbon atoms; however, there is a great need for improvement in these processes. For example, it would be highly desirable to reduce the contact time normally associated with fixed bed operation, while eliminating the difficulties associated with fluidized solid operation such as catalyst attrition and catalyst vaporization which appears to be more pronounced with highly active catalysts. While the moving bed solves some of these difficulties, it is not without its own particular problems such as those derived from the mechanical transportation of catalyst throughout a zone and the existence of "hot spots" in the catalyst bed. The heat of reaction generated on the surface of the solid permits direct oxidation of the hydrocarbon to produce undesirable oxides of carbon.

The more active metal halide catalysts, such as, for example, copper chloride are more volatile at required halogenation temperatures and thus, it is difficult to retain the catalyst in the system and maintain the activity of the catalyst mass over an extended period of time. In such sysems the volatilized catalyst must be recovered by condensation or other troublesome methods and returned in a supported state to the reaction zone. Thus, the economics of operating with fluidized catalyst is poor in spite of the fact that such a system provides better temperature control and higher yield of product for a given period of operation.

It is, therefore, an object of the present invention to overcome the above difficulties by providing an economic and commercially feasible catalyst composition.

Another object of the present invention is to minimize the loss of metal halide catalyst due to volatilization.

Another object of the invention is to provide a process for the chlorination of hydrocarbons wherin an improved contact between hydrocarbon and catalyst is realized.

Another object of this invention is to provide a process for the halogenation of a hydrocarbon wherein good temperature cntrol is maintained in the reaction zone.

Still another object is to provide a process which effects halogenation of a hydrocarbon at a relatively low temperature.

Another object is to eliminate oxidation of hydrocarbons during halogenation in the presence of oxygen, a hydrogen halide and a metal halide halogenating agent.

Sitll another object of this invention is to provide a metal halide catalyst composition which can be readily regenerated and reused in the chlorination of hydrocarbons.

These and other objects of the present invention will become apparent to those skilled in the art from the accompanying description and disclosure.

According to the present invention, a catalyst having an active catalyst portion and a promoter portion, suitable for the halogenation of hydrocarbons, is prepared by dissolving or susepnding a mixture of cupric halide and a dissimilar halide of a metal, preferably having variable valence, such as a halide of copper, titanium, tin, bismuth, chromium, aluminum, vanadium, zinc, mercury, iron, cobalt, molybdenum or nickel in water wherein the concentration of the total metal halide with respect to the water is between about 0.001 mol percent and about 50 mol percent, preferably between about 10 mol percent and about 30 mol percent. Halogenation reactions with such metal halide catalysts can be carried out at lower temperatures than heretofore employed, for example, halogenation of an olefin can be carried out at a temperature between about 120° C. and about 180° C. under pressure sufficient to maintain the catalyst liquid phase. Broadly, for the purposes of the present invention, the halogenation temperature employed may be as high as about 350° C., particulary in cases where paraffins or aromatically unsaturated compounds are reacted. However, it is to be understood that still higher temperatures can be employed if desired, even though the conversion to halogenated hydrocarbons is not measurably improved. It is found that at higher temperatures carbon dioxide is formed in the reaction which lowers the selectivity of the present process in the formation of halogenated product, and is particularly detrimental to the selectivity of 1,2-dichloroethane when ethylene is the hydrocarbon. Thus, the $CO_2$ formation should be maintained below 5 percent of tne hydrocarbon feed. The pressures employed in the halogenation reactions can vary from atmospheric pressure up to about 1,000 p.s.i.g. or above, if desired; however, hydrocarbon pressures within the range of between about 20 p.s.i.g. and about 300 p.s.i.g. are found to be most advantageous.

The hydrocarbons suitable for the halogenation reactions described herein include saturated aliphatics such as methane, ethane, propane, butane, and hydrocarbons containing up to about 10 carbon atoms; unsaturated aliphatic hydrocarbons such as ethylene, propylene, butylene, butadiene, isoprene, and hydrocarbons containing up to about 10 carbon atoms including isomeric types; and aromatically unsaturated hydrocarbons such as benzene, toluene, xylene, styrene, etc. Of this group, the preferred hydrocarbons are the olefins containing from 2 to 5 carbon atoms and benzene, and most preferably, ethylene.

The halogenation reactions referred to herein include chlorination, bromination and iodination; although in the case of iodination, olefins are the hydrocarbons halogenated. The most preferred reaction is that of chlorination. Accordingly, the metal halide catalysts of the present invention are preferably metal chlorides.

As referred to above, for the purposes of the present invention, the catalyst comprises two distinct components, namely the active catalytic portion as the first component, and the promoting portion as the second component which may or may not be catalytically active, but which aids reaction by the attraction and release of a halogen ion. The active catalytic portion, or first component, is a cupric halide, preferably the chloride, and the promoting portion or second component is a metal halide, preferably where the valence of the metal is variable, most preferably a chloride selected from the group consisting of bismuth, copper, chromium, cobalt, iron, mercury, molybdenum, nickel, tin, titanium, or vanadium. It is to be understood, however, that halides selected from Groups IB, IIB, IIIA, IVB, VB, VIB and iron, cobalt and nickel of Group VIII of the Periodic Table and mixtures thereof can be suitably employed as the promoter portion of the catalyst. Within this group, most preferred catalyst systems include cupric-cuprous chloride and cupric-ferric chloride. Higher members of group VIII having atomic numbers of 44 and above, lower the selectivity of the halogenated product in that they promote the formation of oxygenated compounds. Compounds of these elements are, therefore, excluded.

In the chlorination of an olefinic hydrocarbon, preferably having from 2 to 5 carbon atoms in the presence of an aqueous solution of a cupric-cuprous chloride catalyst, the chlorination temperature is most preferably between about 125° C. and about 165° C., and the pressure employed is most preferably within the range of 60 p.s.i.g. to about 300 p.s.i.g. Generally, the chlorination of saturated hydrocarbons requires a higher temperature with some degree of cracking. Therefore, in these cases, temperatures between about 220° C. and about 350° C. are employed and for aromatically unsaturated hydrocarbons such as, for example, benzene, a temperature between about 180° C. and about 300° C. is preferably employed.

When cupric chloride is used as the active catalytic portion of the catalyst to chlorinate a hydrocarbon, the metal of the chloride, by giving up a chlorine atom, attains a lower valence state and becomes cuprous chloride. This spent mixture, when the concentration of the active catalytic portion falls below 90 weight percent of the original cupric chloride content in the solution, is either removed from the reaction zone and regenerated with hydrogen chloride and oxygen, or an oxygen-containing gas, to restore the active cupric chloride in a separate regeneration zone or is regenerated within the reaction zone. In the latter case, the chlorination of the hydrocarbon is carried out with the cupric-cuprous chloride solution or suspension, simultaneously with the oxygen and hydrogen chloride regeneration of the cuprous chloride formed. The hydrogen chloride and oxygen in regeneration are used to oxychlorinate the metal halide of lower valence state, which may be the catalytically active component or the promoter component.

As set forth above, the catalyst is dissolved or partially suspended in water for more intimate contact with reactants in the halogenation zone and as a means of conducting the halogenation reaction at lower temperature, avoiding vaporization of catalyst. In addition to the advantage of being able to conduct the halogenation reactions of the present process at lower temperatures thereby avoiding direct oxidation of the hydrocarbon, the aqueous catalyst solution allows for better overall temperature control in the reactor, which in the case of ethylene chlorination at from 125° C. to about 165° C. results in high selectivity to the 1,2-dichloroethane product, a valuable chemical compound and intermediate in the formation of other desirable compounds. The aqueous catalyst systems also result in the conversion to halogenated hydrocarbon at a faster rate than heretofore obtainable.

In the chlorination of ethylene in the presence of an aqueous cupric-cuprous chloride solution at a temperature not in excess of 185° C., a high selectivity of conversion to 1,2-dichloroethane at least as high as 98 mol percent based on chlorinated product is obtainable. This compound is a valuable intermediate in the manufacture of vinyl chloride by pyrolysis of the saturated dichloride and thus the process using the catalyst of the present invention at a temperature below 165° C. finds particular commercial value in the economical synthesis of this unsaturated chloride and provides a new process wherein the hydrogen chloride produced by the pyrolysis of the saturated compound can be used to at least partially regenerate the catalyst solution. It is to be understood that additional chlorine for regeneration purposes may be supplied as hydrogen chloride or chlorine. The hydrogen chloride concentration is limited to that required for regeneration in order to avoid excess hydrogen chloride being present which would lead to the formation of ethyl chloride.

Another advantage of the present process employing the aqueous catalyst solutions is that an aqueous or dilute solution of hydrogen halide can be fed to the reaction zone in place of the dried, highly concentrated hydrogen halide employed heretofore. In the present process, excess water is vaporized from the reaction zone by the heat of reaction while a portion of that generated serves to maintain the water content of the liquid aqueous catalyst medium. It has also been found that with the catalyst solutions, little or no hydrogen halide is present in the gaseous reactor effluent.

Still another advantage of the present process is that the vapor pressure of the system can be controlled by the addition of certain inert salts such as, for example, sulfates of any of the promoter metals mentioned above, e.g., cupric sulfate, or ferric sulfate. When the vapor pressure of the catalytic solutions is reduced, adiabatic conditions can be achieved at lower pressure at a given percent conversion per pass or at a given total pressure, a lower conversion per pass is required. This is demonstrated in FIGURE 1 for a single zone reactor-regenerator and in FIGURE 2 for a separate reactor and regenerator.

Referring to FIGURE 1, it is found that at a given catalyst solution vapor pressure, e.g. 20 p.s.i.a. and a 10 percent conversion per pass (plotted on the Y axis), then the total pressure in the reactor which would be required is 47 p.s.i.a. (plotted on the X axis). When the pressure is 30 p.s.i.a, 21 percent conversion per pass would have been required at the same reactor pressure for adiabatic operation.

Figure 2:
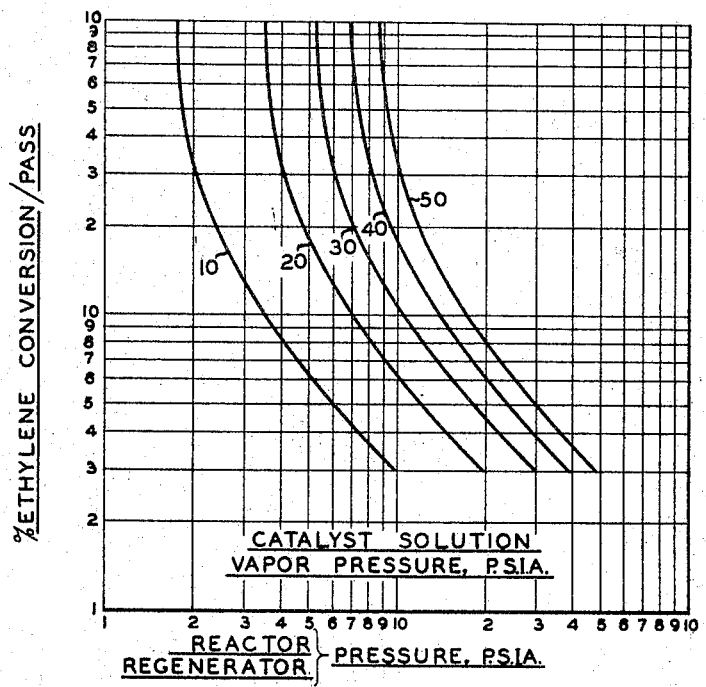
Figure 1:
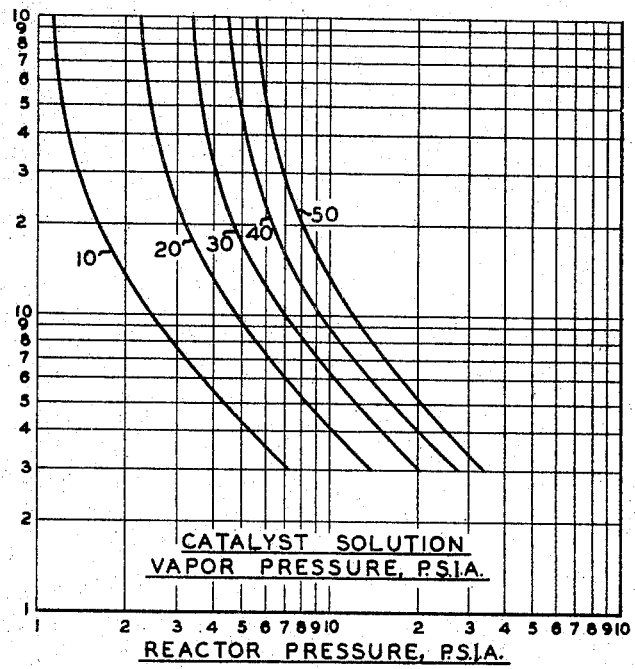
Figure 2:
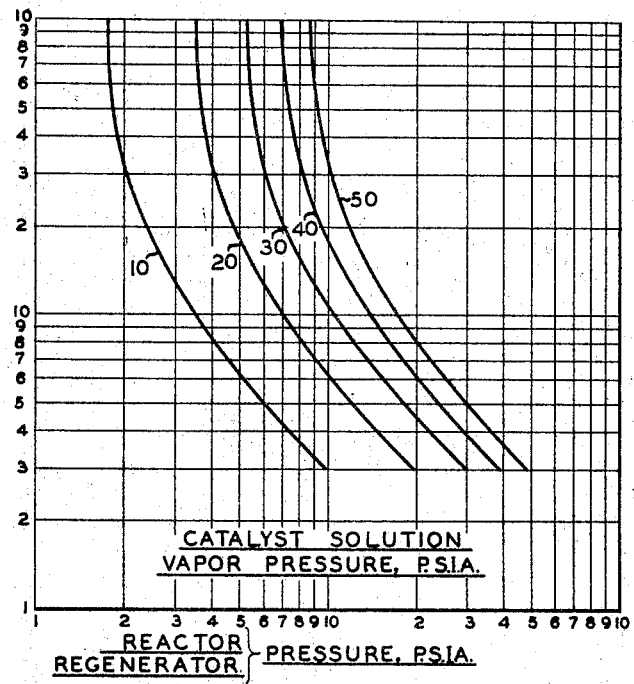

In a similar manner, referring to FIGURE 2, a 10 percent conversion per pass and a catalyst solution vapor pressure of 20 p.s.i.a., the reactor pressure of 70 p.s.i.a. is required; however, at the same conversion and a catalyst solution vapor pressure of 50 p.s.i.a., a reactor pressure of 175 p.s.i.a. is required for adiabatic operation.

The apparatus used where the aqueous metal halide catalyst solution is employed, should be composed of, or lined with, acid-resistant materials in order that the catalytic solution will not cause corrosion problems in the system. For example, glass or ceramic-lined equipment is suggested as being both inexpensive and readily available for this type of reaction.

For a better understanding of the process of the present invention, reference is now had to the accompanying drawings, FIGURES 3 and 4, which illustrate specific embodiments of the process, but which are not to be construed in any way limiting to the scope of the invention.

FIGURE 3 illustrates a process wherein halogenation and catalyst regeneration are carried out in separate zones, namely reactor 3 and regenerator 4. In this operation, air, in place of oxygen can be used as the regeneration gas since the inerts associated therewith (e.g. nitrogen and argon) can be prevented from entering the reactor and causing pressure build up in the system.

According to the process of FIGURE 3, ethylene is introduced by means of valved feed line 5 and recycle line 6 (hereinafter described) into reactor 3 in contact with an aqueous solution of cupric-cuprous chloride at a rate of 2 gram mols to 200 gram mols of ethylene per liter of catalyst solution per hour. By way of example, 10.0 gram mols per hour of ethylene is fed per liter of 6 molar $CuCl_2$–2 molar CuCl catalyst in aqueous solution entering the reactor from line 7 at a temperature of 150° C. under 125 p.s.i.g. The vaporous reactor effluent containing chlorinated product and unreacted components (e.g. 1 gram mol per liter per hour of 1,2-dichloroethane; 0.01 gram mol per liter per hour of monochloroethane; 9.0 gram mols per liter per hour of ethylene; and 4.7 gram mols per liter per hour of steam) is withdrawn from reactor 3 by means of line 8 and passed to condenser 10 and then into decanting zone 12 wherein gaseous and liquid phases are separated, at a temperature between about 25° C. and about 80° C. under from about 90 p.s.i.g. to about 120 p.s.i.g. or approximately the reactor pressure. In the present case, three phases are formed in the decantation zone, namely, a gaseous phase comprising ethylene and monochloroethane; a liquid water phase and a liquid 1,2-dichloroethane phase. The gaseous phase is withdrawn from the decanting zone at a rate of about 9.1 gram mols per liter of catalyst per hour in reactor 3, passed through line 14 and line 6 through pump 18 and recycled to reactor 3 as a part of the feed thereto. The aqueous liquid phase is removed by way of line 15 and discarded. The liquid chlorinated hydrocarbon phase is withdrawn from the decantation zone by means of line 20 and passed to cracking zone 22 wherein at a temperature of between about 480° C. and about 580° C., under from about 0 p.s.i.g. to about 100 p.s.i.g. (in the present case, at a temperature of 550° C. under 50 p.s.i.g.), the 1,2-dichloroethane is converted to vinyl chloride in between about 25 mol percent to about 85 mol percent conversion per pass, e.g., 60 mol percent conversion per pass.

The product mixture from cracking zone 22 is passed to distillation zone 19 by means of line 17. It is to be understood that distillation zone 19 may comprise one or more separate fractionating steps performed in one or several columns. Vaporous hydrogen chloride is withdrawn in line 26 from the distillation zone and recycled to regenerator 4, together with dilute hydrogen chloride feed entering line 26 from valved feed line 28. Unconverted dichloroethane is withdrawn from zone 19 by line 23 and recycled to cracking zone 22, while vinyl chloride product is withdrawn from zone 19 by means of line 29 as the product of the process. The hydrogen chloride separated in distillation zone is withdrawn at a rate of 1 mol per mol of 1,2-dichloroethane reacted. Make-up hydrogen chloride feed and hydrogen chloride from zone 19 is passed to zone 4 with an acid concentration of between about 22 weight percent and about 35 weight percent (e.g. 33 weight percent acid concentration). Air, at a rate of about 2.5 gram mols per liter of catalyst per hour is introduced into regenerator 4 by means of valved line 30 and the oxygen in the air reacts with the dilute hydrogen chloride and cuprous chloride to produce cupric chloride. This regenerates the cuprous-cupric chloride catalyst to its original activity. In operating this process, the mol ratio of cupric chloride to cuprous chloride should not be permitted to fall to the point where cuprous chloride precipitation can cause fouling in the apparatus. The spent catalyst is introduced into regenerator 4 at a rate of 2.3 volumes per volume of catalyst in reactor 3 by means of line 32. The regenerator is operated at a temperature of from about 130° C. to about 150° C. under from about 125 p.s.i.g. to about 120 p.s.i.g. or at approximately reactor conditions; in the present case, at a temperature of 150° C. under 125 p.s.i.g. The regenerated cupric-cuprous chloride aqueous solution, the concentration of which is adjusted by the water content of dilute acid from line 28, is then recycled to reactor 3 by means of line 7 through spray heads in the upper part of the tower and inert gases such as, for example, nitrogen, and argon which enter the system in the air feed stream are vented to the atmosphere from the top of the regenerator through valved line 34.

Although the above process utilizes an aqueous cupric-cuprous chloride catalyst to produce 1,2-dichloroethane as an intermediate and vinyl chloride as an end product, it is to be understood that an aqueous cupric-cuprous bromide catalyst can be substituted in the above description to produce 1,2-dibromoethane as an intermediate and vinyl bromide as the end product. In this case, however, hydrogen bromide in place of the hydrogen chloride is used to regenerate the cupric-cuprous bromide in regenerator 4.

FIGURE 4 of the drawings illustrates a process wherein chlorination of a hydrocarbon and catalyst regeneration of the catalyst solution is conducted in the same zone. The following embodiment is described in reference to chlorination; however, it is to be understood that the substitutions discussed above are also applicable in this embodiment of the process.

Ethylene feed entering valved line 35 at a rate of 1.0 gram mols per liter of catalyst solution per hour is passed to line 36 wherein it is admixed with 2.0 gram mols per hour of aqueous hydrogen chloride having an acid concentration of 32 weight percent and 9.0 gram mols per liter of catalyst per hour of ethylene recycle from line 40 (hereinafter described). This mixture is then passed into reactor 37 wherein, in the presence of 0.5 gram mol of molecular oxygen per liter of catalyst entering zone 37 from valved line 38, the ethylene is reacted with cupric chloride of an aqueous 6 molar $CuCl_2$–2 molar CuCl catalyst. The temperature in the reaction zone is maintained at about 150° C. and about 95 p.s.i.g. is imposed on the mixture in zone 37. By maintaining the above amount of molecular oxygen and hydrogen chloride in this zone, the concentration of cupric chloride is maintained at a steady state and a 10 percent conversion of ethylene to chlorinated product, of which more than 90 weight percent is 1,2-dichloroethane, is obtained as a gaseous effluent in admixture with unconverted ethylene.

The gaseous effluent is withdrawn by means of line 42, passed to condenser 44 and the resulting condensate introduced into decantation zone 46 wherein, at a temperature of 40° C. under 95 p.s.i.g., unconverted ethylene gas is separated in line 48 from liquid 1,2-dichloroethane. Water is withdrawn as a separate liquid phase in line 43 and removed from the process.

The ethylene gas which is withdrawn from zone 46 in line 48 is pressured in pump 50 and recycled to the reaction zone 37 by means of lines 40 and 36 as hereinabove described.

The liquid 1,2-dichloroethane is withdrawn from decantation zone 46 by means of line 52 and passed to cracking zone 54 wherein at a temperature of about 550° C. under 50 p.s.i.g., 1,2-dichloroethane is converted to vinyl chloride and hydrogen chloride in about 60 mol percent per pass. The cracked mixture is then passed by means of line 59 to distillation zone 41 wherein the components of the cracked mixture are separated. Hydrogen chloride is withdrawn as a vapor in line 36 and recycled to reactor 37, together with ethylene feed entering line 36 from valved line 35, and dilute hydrogen chloride feed (20–35 weight percent) entering line 36 from valved line 60. Unconverted liquid 1,2-dichloroethane is withdrawn from zone 41 and recycled to zone 54 by means of line 58 and the vinyl chloride is recovered from zone 41 as the product of the process by means of line 45. The dilute hydrogen chloride introduced into line 36 serves to maintain required hydrogen chloride feed to the reactor. The concentration of the hydrogen chloride is varied to maintain the water balance in the reactor.

Many modifications of the above-described embodiments illustrated in FIGURES 3 through 4 will become apparent to those skilled in the art. For example, any of the previously disclosed promoters, particularly $FeCl_3$, $CrCl_3$, HgCl, $AlCl_3$, $TiCl_3$, $VCl_3$ and $MnCl_2$ can be substituted for cuprous chloride in the above catalyst system. It is also to be understood in processes using gaseous hydrocarbon that the hydrocarbon may be passed through the aqueous catalyst solution or the aqueous catalyst can be sprayed through the gaseous hydrocarbon phase. The examples which follow are set forth to show the effect of various concentrations in the catalyst system and to provide examples of other hydrocarbons which may be halogenated according to the teachings of this process. However, these examples should not be construed to limit the scope of the present invention.

*Example 1*

Into a titanium-lined metal reactor containing 1 liter of an aqueous mixture of 7 M $CuCl_2$ and 0.5 M CuCl was added 350 standard ccs. per minute of ethylene at a temperature of 150° C. under a total pressure of 300 p.s.i.g. Under these conditions, 5 mol percent of ethylene was converted to 1,2-dichloroethane at a selectivity of greater than 98 mol percent. The remaining portion of the mixture was found to contain ethyl chloride, unreacted ethylene and water.

*Example 2*

Two separate glass reactors, the first containing an aqueous solution of 5 M $CuCl_2$ and 0.5 M CuCl, and the second containing an aqueous solution of 7 M $CuCl_2$ and 1.0 M CuCl, are both maintained at a temperature of 160° C. Propylene is passed through each of the above solutions at a partial pressure of 100 p.s.i. In the first case, 1,2-dichloropropane is produced in a 1 mol percent conversion to 1,2-dichloropropane. In the second case, about 2 mol percent conversion to 1,2-dichloropropane is obtained. This product can be subjected to pyrolysis to yield chloropropenes, if desired.

*Example 3*

Into a glass reactor containing 1 liter of an aqueous mixture of 7 M $CuCl_2$ and 0.5 M CuCl is added 350 standard ccs. per minute of ethylene at a temperature of 150° C. The partial pressure of ethylene in the reactor is 120 p.s.i.g. A conversion of 3 mol percent per pass to 1,2-dichloroethane is obtained. The selectivity of chlorinated product to 1,2-dichloroethane is about 98 percent.

*Example 4*

Into a glass-lined autoclave containing 40 ml. of aqueous solution of 7 M $CuCl_2$ and 0.5 M CuCl is added 0.056 mol of benzene. The temperature in the reaction zone is adjusted to 190° C. and the reaction is allowed to take place over a period of 18 hours, after which the autoclave is cooled to ambient temperature. Upon opening the cooled autoclave, it is found that the benzene layer has disappeared and chlorinated benzenes are produced in about a 10 percent yield.

*Example 5*

To 3 liters of aqueous 7 M $CuCl_2$–1 M CuCl catalyst contained in a glass-lined pressure vessel, is passed 4.6 mols of ethylene per hour, at a temperature of about 150° C. and a total pressure of 300 p.s.i.g. Under these conditions, 15 mol percent of the ethylene is converted per pass to 1,2-dichloroethane with a selectivity for the 1,2-dichloroethane greater than 98 percent.

The catalyst is maintained in the steady state by the addition of 1.38 mols of hydrogen chloride and 0.345 mol of oxygen per hour. Water is added to replace that which is lost to the system due to carry over with the effluent vaporous mixture containing product which is removed from the reaction zone. The effluent is cooled to condense the 1,2-dichloroethane, while the remaining vaporous unconverted ethylene is recycled to the reaction zone. The reaction taking place in this stage of the process is represented by the following equation:

$$2C_2H_4 + 4HCl + O_2 \rightarrow 2C_2H_4Cl_2 + 2H_2O$$

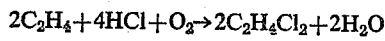

The condensed dichloroethane is cracked to vinyl chloride and hydrogen chloride at a temperature of 550° C. under 20 p.s.i.g., and the hydrogen chloride is used in the regeneration spent catalyst. Thus, the overall reaction of the entire process is represented by the following equation:

$$2C_2H_4 + O_2 + 2HCl \rightarrow 2C_2H_3Cl + 2H_2O$$

*Example 6*

To a ceramic-lined reactor containing 5 liters of an aqueous catalyst consisting of 1.1 M $CuCl_2$ and 4.5 M $FeCl_3$ is added 7.6 mols of ethylene per hour. At a temperature of 150° C. and a total pressure of 300 p.s.i.g. a 25 mol percent conversion per pass of ethylene to 1,2-dichloroethane is obtained. During the course of an hour, about 30 percent of the catalyst is removed from the reaction zone per hour and transferred to a separate regenerator wherein 3.8 mols of hydrogen chloride and 9.5 mols of air are admixed with the spent catalyst and the catalyst regenerated.

Since the heat of reaction generated in the reactor and the regenerator is more than sufficient to allow for adiabatic operation, dilute aqueous hydrogen chloride (a 32 percent solution) is fed to the regenerator along with concentrated hydrogen chloride obtained from a later stage cracking of 1,2-dichloroethane, which cracking is carried out in accordance with Example 5. Under these conditions, water carried into the regenerator is vaporized and carried out of the system together with inerts such as nitrogen and argon which enter the regenerator in the air feed. These vapors are vented to the atmosphere, while the regenerated liquid catalyst is recycled to the reaction zone.

The effluent gas mixture withdrawn from the reactor, containing 1,2-dichloroethane, water, and unreacted ethylene is cooled to condense only the 1,2-dichloroethane and water. The remaining vapors are then recycled to the reactor. The 1,2-dichloroethane is cracked at a temperature of 550° C. under 25 p.s.i.g. to yield vinyl chloride and hydrogen chloride.

*Example 7*

Ethylene was passed through 1 liter of an aqueous 1.1 M $CuCl_2$–4.5 M $FeCl_3$ solution contained in a glass reactor at a rate of 1.9 mols per hour. A a temperature of 150° C. under 300 p.s.i.g., 4 mol percent of the ethylene was converted per pass to 1,2-dichloroethane. The selectivity to the dichloroethane was 95 percent.

The salts in the above catalyst combination reduce the water vapor pressure of the system to about 45 percent that of pure water. This reduction in the vapor pressure of water is important in that the system is adiabatic at the reduced pressure and at a lower conversion per pass than that permissible with a higher catalyst vapor pressure. This effect is demonstrated in FIGURES 1 and 2 referred to above.

*Example 8*

Into an acid brick lined metal reactor containing 1 liter of 3.75 M $CuBr_2$–1.0 M CuBr is passed $C_2H_4$ at a rate of 1.6 mols per hour. The total pressure over the system is 300 p.s.i.g. and the temperature 135° C. The conversion to 1,2-dibromoethane is 2 mol percent per pass with selectivity in excess of 90 percent.

Having thus described our invention we claim:

1. A process for producing a halogenated hydrocarbon by reacting an olefin having from two to ten carbon atoms at a temperature of at least 120° C. with an aqueous solution of cupric halide and a metal halide promoter of the corresponding halide wherein the halogen of the cupric halide and of the promoter has an atomic number above 9 in the Periodic Table and wherein the metal is selected from the group consisting of zinc, cadmium, tin, bismuth, mercury, copper in the cuprous state, aluminum, titanium, vanadium, chromium, molybdenum and iron, cobalt and nickel and mixtures thereof, and wherein the concentration of the total cupric halide-metal halide promoter in solution is between about 10 and about 50 mol percent and the proportion of cupric halide to promoter is between about 0.01:1 and about 100:1; maintaining the metal halide mixture in aqueous solution in the reaction zone; withdrawing a gaseous effluent from the reaction zone containing unreacted hydrocarbon and the corresponding halogenated hydrocarbon product; and recovering the halogenated hydrocarbon from the effluent as the product of the process.

2. The process of claim 1 wherein a cupric-cuprous halide in water is contacted with the olefin to produce the corresponding halogenated hydrocarbons.

3. The process of claim 1 wherein cupric-cuprous chloride in water is contacted with the olefin to produce a chlorinated hydrocarbon.

4. The process of claim 1 wherein cupric-cuprous bromide in water is contacted with the olefin to produce a brominated hydrocarbon.

5. A process for producing a halogenated hydrocarbon which comprises: reacting, in a reaction zone at a temperature of at least 120° C., ethylene with an aqueous solution of cupric halide and promoter selected from the group consisting of the corresponding halide of copper in the cuprous state, titanium, tin, bismuth, chromium, aluminum, vanadium, zinc, cadmium, mercury, iron, cobalt, molybdenum and nickel and mixtures thereof wherein the halogen of the cupric halide and of the promoter has an atomic number above 9 in the Periodic Table and, wherein the concentration of the total cupric halide-metal halide promoter in solution is between about 10 mol percent and about 50 mol percent, the proportion of cupric halide to promoter being maintained between about 0.1:1 and about 10:1; maintaining the cupric halide-promoter in aqueous solution in the reaction zone; withdrawing a gaseous effluent from the reaction zone containing unreacted ethylene and the corresponding 1,2-dihaloethane and condensing water and the 1,2-dihaloethane from the gaseous mixture; separating the unreacted ethylene as vapors from the remaining liquid 1,2-dihaloethane and water; regenerating with oxygen and the hydrogen halide the cupric halide-promoter solution.

6. The process of claim 5 wherein the cupric-halide-promoter solution is an aqueous solution of cupric-cuprous chloride, and the 1,2-dihaloethane is 1,2-dichloroethane.

7. The process of claim 5 wherein the halogenation reaction and the regeneration reaction are performed simultaneously in the same zone in the presence of molecular oxygen.

8. A process for producing a halogenated hydrocarbon which comprises: reacting, in a reaction zone at a temperature of at least 120° C., ethylene with an aqueous solution of cupric halide and promoter selected from the group consisting of the corresponding halide of copper in the cuprous state, titanium, tin, bismuth, chromium, aluminum, vanadium, zinc, cadmium, mercury, iron, cobalt, molybdenum and nickel and mixtures thereof wherein the halogen of the cupric halide and of the promoter has an atomic number above 9 in the Periodic Table and wherein the concentration of the total cupric halide-metal halide promoter in solution is between about 10 mol percent and about 50 mol percent, the proportion of cupric halide to promoter being between about 0.1:1 and about 10:1; maintaining the cupric halide and the promoter in aqueous solution in the reaction zone; withdrawing a gaseous effluent from the reaction zone containing unreacted ethylene and 1,2-dihaloethane and condensing 1,2-dihaloethane from the gaseous effluent; separating the unreacted ethylene as vapors from the liquid 1,2-dihaloethane; withdrawing as a spent halide mixture, the catalyst mixture from the reaction zone and passing the spent halide mixture to a separate regeneration zone wherein the cupric halide is restored to its original concentration by halogenation in the presence of an oxygen-containing gas and hydrogen halide; and recycling the regenerated catalyst solution to the reaction zone.

9. The process of claim 8 wherein the cupric halide-promoter solution is an aqueous solution of cupric-cuprous chloride, the 1,2-dihaloethane is 1,2-dichloroethane, and the reaction of ethylene with the cupric halide-promoter solution is effected at a temperature of from about 120° C. to 180° C.

10. The process of claim 8 wherein the hydrogen halide is flashed from the 1,2-dihaloethane and is recycled to the reaction zone.

11. The process of claim 8 wherein the concentration of the total cupric halide-metal halide mixture in solution is adjusted by the addition of a dilute hydrogen halide feed stream to the regenerator zone.

12. A process for producing a chlorinated hydrocarbon from an olefin having from two to ten carbon atoms which comprises: reacting, in a reaction zone at a temperature of at least 120° C., the olefin with an aqueous solution of cupric chloride and a promoter selected from the group consisting of the chloride of copper in the cuprous state, titanium, tin, bismuth, chromium, aluminum, vanadium, zinc, cadmium, mercury, iron, cobalt, molybdenum and nickel and mixtures thereof, wherein the concentration of the total cupric chloride-metal chloride promoter in solution is between about 10 mol percent and about 50 mol percent, the proportion of cupric chloride to promoter being maintained between about 0.01:1 and about 100:1; maintaining the cupric chloride and the promoter in aqueous solution in the reaction zone; withdrawing a gaseous effluent from the reaction zone containing unreacted olefin, and the corresponding chlorinated hydrocarbon product; and recovering the chlorinated hydrocarbon from the system.

13. The process of claim 12 wherein the aqueous solution of cupric chloride and promoter is sprayed through the gaseous phase of the hydrocarbon.

14. A process for producing 1,2-dichloroethane which comprises: reacting ethylene at a temperature of between about 120° C. and about 180° C. in a chlorination zone, with an aqueous solution of cupric chloride and cuprous chloride wherein the concentration of the copper chlorides in solution is between about 10 mol percent and about 30 mol percent, the proportion of cupric chloride to cuprous chloride being between about 0.1:1 and about 10:1; maintaining the cupric chloride-cuprous chloride in aqueous solution in the reaction zone; withdrawing a gaseous effluent from the reaction zone containing unreacted ethylene and 1,2-dichloroethane; and condensing 1,2-dichloroethane from the gaseous effluent and separating the unreacted ethylene as vapors from the liquid 1,2-dichloroethane.

15. The process of claim 14 wherein hydrogen chloride together with oxygen is employed to adjust the concentration of copper chlorides in solution and to regenerate the cupric chloride-cuprous chloride when the concentration of the cupric chloride with respect to cuprous chloride falls below said proportion.

16. A process for producing 1,2-dichloroethane which comprises: reacting ethylene at a temperature of between about 120° C. and about 180° C. in a chlorination zone, with an aqueous solution of cupric chloride and cuprous chloride wherein the concentration of the copper chlorides in solution is between about 10 mol percent and about 30 mol percent, the proportion of cupric chloride to cuprous chloride being between about 0.1:1 and about 10:1, maintaining the cupric chloride-cuprous chloride in aqueous solution in the reaction zone, and recovering 1,2-dichloroethane with a selectivity of more than about 90 percent, based on chlorinated product, from the reaction zone as the product of the process.

(References on following page)

References Cited by the Examiner
UNITED STATES PATENTS

| | | | |
|---|---|---|---|
| 1,963,761 | 6/34 | Prahl | 260—650 |
| 2,310,283 | 2/43 | Gilliland | 260—663 |
| 2,399,488 | 4/46 | Hearne | 260—659 |
| 2,644,846 | 7/53 | Johnson et al. | 260—659 |
| 2,755,315 | 7/56 | Eberly | 260—656 |
| 2,779,805 | 1/57 | Millard | 260—654 |
| 2,809,221 | 10/57 | Thomas et al. | 260—654 |
| 2,822,410 | 2/58 | Wojcik et al. | 260—654 |
| 2,875,255 | 2/59 | Eberly | 260—656 |
| 2,915,565 | 12/59 | Jacobowsky et al. | 260—654 |
| 3,055,955 | 9/62 | Hodges | 260—659 |
| 3,079,444 | 2/63 | Jacobowsky et al. | 260—654 |

FOREIGN PATENTS

| | | |
|---|---|---|
| 451,379 | 9/43 | Canada. |
| 517,009 | 9/55 | Canada. |
| 1,309,610 | 10/62 | France. |
| 254,536 | 12/48 | Switzerland. |

LEON ZITVER, *Primary Examiner.*